United States Patent
Kosugi et al.

(10) Patent No.: US 6,346,220 B1
(45) Date of Patent: Feb. 12, 2002

(54) WASTE PLASTIC DECHLORINATION APPARATUS

(75) Inventors: Shinichiroh Kosugi, Yokohama; Kenji Hata, Kawasaki; Takeshi Imamura, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/142,835

(22) PCT Filed: Feb. 2, 1998

(86) PCT No.: PCT/JP98/00425

§ 371 Date: Sep. 29, 1998

§ 102(e) Date: Sep. 29, 1998

(87) PCT Pub. No.: WO98/33608

PCT Pub. Date: Aug. 6, 1998

(30) Foreign Application Priority Data

Jan. 31, 1997 (JP) .................................................. 9/19118

(51) Int. Cl.$^7$ ................................................. B09B 3/00
(52) U.S. Cl. .................... 422/184.1; 110/185; 110/255; 241/292.1; 425/208; 422/273
(58) Field of Search ................................. 110/185, 186, 110/189, 229, 232, 255, 257; 422/184.1, 273; 588/206, 213, 228; 241/38, 82.1, 292.1; 425/200, 202, 208, 209

(56) References Cited

U.S. PATENT DOCUMENTS

| | | | | |
|---|---|---|---|---|
| 3,765,319 A | * | 10/1973 | Fox | 99/343 |
| 4,001,852 A | * | 1/1977 | Gall | 354/313 |
| 5,608,136 A | * | 3/1997 | Maezawa et al. | 588/228 |
| 5,750,158 A | * | 5/1998 | Wissmann et al. | 424/144 |
| 5,827,549 A | * | 10/1998 | Rancich et al. | 425/145 |
| 6,112,675 A | * | 9/2000 | Potter et al. | 110/229 |

FOREIGN PATENT DOCUMENTS

| | | |
|---|---|---|
| JP | 05245463 | 9/1993 |
| JP | 7-82569 | 3/1995 |
| JP | 8-120285 | 5/1996 |
| JP | 8-134255 | 5/1996 |

* cited by examiner

*Primary Examiner*—Hien Tran
*Assistant Examiner*—Frederick Varcoe
(74) *Attorney, Agent, or Firm*—Finnegan, Henderson, Farabow, Garrett & Dunner, L.L.P.

(57) ABSTRACT

A waste plastic dechlorination system comprises a dechlorination furnace 1 for heating and thermally decomposing waste plastics, and a rotating cutter 4 provided in the dechlorination furnace 1. A pressure gauge 9, a flow meter 10 and an exhaust pump 12 are sequentially connected to the dechlorination furnace 1 via an exhaust pipe 7. The waste plastics heated and decomposed in the dechlorination furnace 1 are discharged into a discharge tank 15.

33 Claims, 8 Drawing Sheets

WASTE PLASTIC DECHLORINATION APPARATUS

TECHNICAL FIELD

The present invention relates to a waste plastic dechlorination system for removing toxic chlorine from vinyl chlorides in order to form solid fuels from waste plastics containing vinyl chlorides.

BACKGROUND ART

In order to form solid fuels from waste plastics containing vinyl chlorides, it is necessary to carry out a pretreatment to remove hydro-chloride gas normally produced at thermal decomposition of vinyl chlorides. When the formed solid fuel is burned, not only hydrogen chloride, but highly poisonous substances, such as dioxin, are also formed, unless the dechlorination treatment of waste plastics is carried out. As described in Japanese Patent Laid-Open No. 5-245463, the dechlorination treatment of waste plastics is carried out by utilizing the property that vinyl chlorides are thermally decomposed at about 300° C. to liberate hydrogen chloride. However, the system disclosed in Japanese Patent Laid-Open No. 5-245463 can treat only vinyl chlorides having specific compositions.

Practical waste vinyl chlorides contain a substance causing the production of phthalic anhydride, i.e., a plasticizer. When a vinyl chloride contains such a plasticizer, the dechlorination rate is reduced to about 96%.

If the dechlorination rate remains low, the formed solid fuel cannot be used as a fuel since hydrochloric acid and dioxin are produced when the fuel is burned. Moreover, since phthalic anhydride is crystallized at a low temperature, there is also a problem in that pipes will be plugged clogged with the phthalic anhydride.

In addition, some vinyl chlorides are contained in waste plastics that have unusual shapes which are difficult to treat, such as bottle shapes or block shapes. In practice, these waste plastics are broken up to carry out the dechlorination process. In a conventional system, it is not possible to input waste plastics to the system unless the waste plastics are broken up into very fine particles. An economical particle size is a few centimeters. In order to break up the waste plastics to an even finer size, a separate shredder would be required. The shredded plastics are bulky since the plastics contain a large quantity of air, and the heat transfer rate is bad. Therefore, there is also the problem in that the throughput of the conventional system is small.

Moreover, in the system disclosed in Japanese Patent Laid-Open No. 5-245463, it is required to adjust the valve position in accordance with the concentration of vinyl chlorides in plastics to be treated and the revolving speed of the blade screw. Therefore, there is a disadvantage in that the dechlorination rate is greatly changed if the composition of plastics to be treated is changed. Moreover, in the above described system, dechlorination rate measurement are required to chemically analyze the objects, in order to determine how well the treated plastics have been dechlorinated. However, since such analysis is time consuming, it is difficult to adjust the system, and it requires a great deal of labor to determine whether the treated plastics can be used as a fuel.

DISCLOSURE OF THE INVENTION

It is therefore an object of the present invention to eliminate the aforementioned problems and to provide a waste plastic dechlorination system, which can effectively remove chlorine from waste plastics containing vinyl chlorides.

According to the present invention, a waste plastic dechlorination system comprises: a dechlorination furnace having an inlet and an outlet for thermal-ecomposing a waste plastic containing vinyl chloride to dechlorinate the waste plastic; a rotating cutter provided in the dechlorination furnace; a pressure gauge for measuring a pressure in the dechlorination furnace; an exhaust apparatus connected to the dechlorination furnace via an exhaust pipe, for extracting a gas produced in the dechlorination furnace; and a control unit for controlling the exhaust apparatus in accordance with a signal outputted from the pressure gauge.

According to the present invention, the waste plastic containing vinyl chlorides introduced into the dechlorination furnace via the inlet is thermally decomposed and dechlorinated in the dechlorination furnace. During this time, the waste plastic is cut with the rotating cutter in the dechlorination furnace, and thermal-decomposition process proceeds. The pressure in the dechlorination furnace is detected by the pressure gauge, and the gas produced in the dechlorination furnace is exhausted by the exhauster.

BRIEF DESCRIPTION OF THE INVENTION

BEST MODE FOR CARRYING OUT THE INVENTION

First Preferred Embodiment

Referring to the accompanying drawings, the preferred embodiments of the present invention will be described below. FIGS. 1 through 4 show the first preferred embodiment of a waste plastic dechlorination system according to the present invention.

Figure 1:
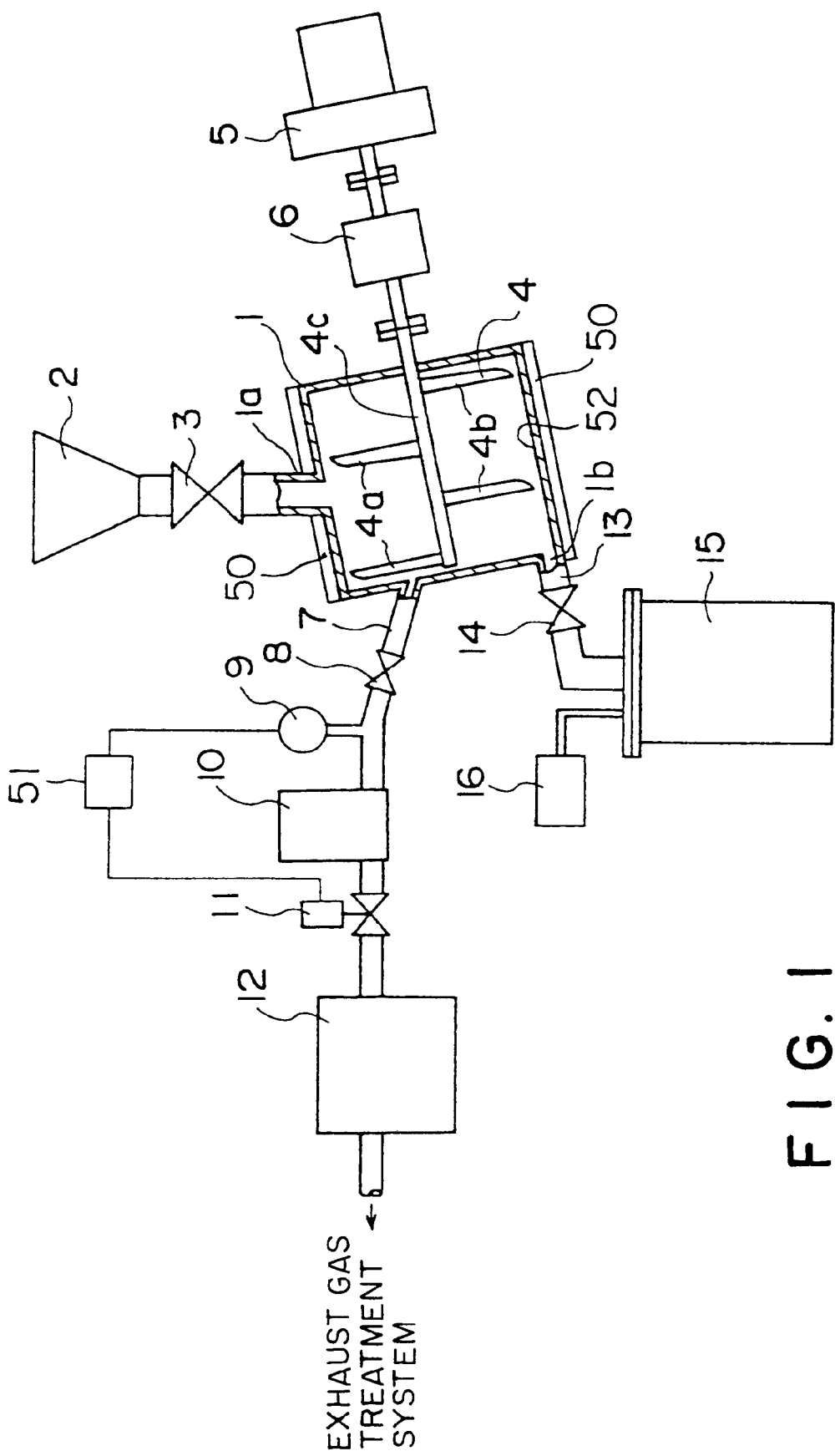
FIG. 1 is a schematic view of the first preferred embodiment of a waste plastic dechlorination system according to the present invention.
Figure 2:
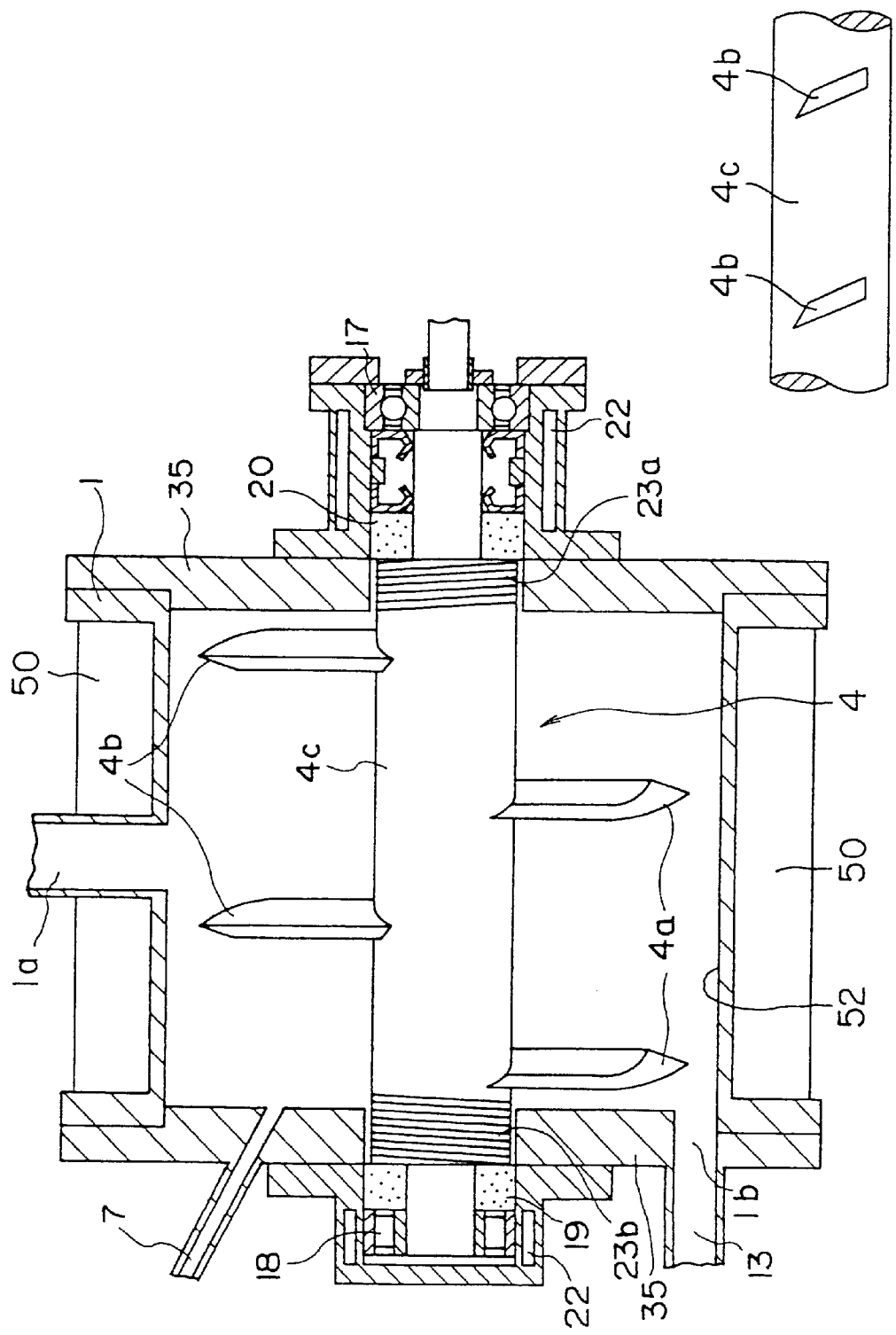
FIG. 2a is an enlarged view showing the interior of a dechlorination furnace.
FIG. 2b is a view showing a rotating cutter.

As shown in FIG. 1, the waste plastic dechlorination system comprises a dechlorination furnace 1, having an inlet 1a and an outlet 1b for thermally decomposing waste plastics containing vinyl chloride objects (hereafter vinyl chlorides) to dechloridize the waste plastics, and a rotating cutter 4 provided in the dechlorination furnace 1. The bottom 52 of the dechlorination furnace 1 is inclined, so that the outlet 1b is arranged at the bottom.

A hopper 2 is connected to the inlet 1a of the dechlorination furnace 1 via an inlet valve 3, and a discharge tank 15 is connected to the outlet 1b of the dechlorination furnace 1 via a discharge pipe 13 having a discharge valve 14. The discharge tank 15 is also connected to a vacuum pump 16. The rotating cutter 4 comprises a shaft 4c, and blades 4a, 4b fixed to the shaft 4c. The shaft 4c is connected to a motor 5 via a torque meter 6.

In addition, an exhaust pipe 7 having an exhaust valve 8 is connected to the dechlorination furnace 1. A pressure gauge 9, a flow meter 10, a solenoid valve 11 and an exhaust pump 12 are sequentially connected to the exhaust pipe 7.

A heating/temperature control unit 50 is mounted on the dechlorination furnace 1, so that the temperature in the dechlorination furnace 1 is maintained at about 350° C. FIGS. 2a and 2b show the interior of the dechlorination furnace 1. As described above, the rotating cutter 4 has the blades 4a, 4b. The blades 4a, 4b have symmetric shapes to each other. As shown in FIG. 2b, the base portions of the blades 4b are arranged at an angle with the shaft 4c. Similarly, the base portions of the blades 4a are arranged at an angle with the shaft 4c. Thus, since the base portions of the blades 4a, 4b are arranged at an angle with the shaft 4c, waste plastics can be moved in an axial direction of the shaft 4c by means of the blades 4a, 4b and mixed. The shaft 4c is supported on bearings 17, 18. Both ends of the shaft 4c are provided with screw threads 23a, 23b, which run inwardly with respect to the direction of rotation of the shaft 4c, and spacers 19, 20 are provided outside thereof. The spacers 19, 20 are made of a ceramic, such as carbon, and mounted so as not to contact the shaft 4c. Moreover, cooling jackets 22 are provided radially outside of the bearings 17, 18.

With this construction, the operation of this preferred embodiment will be described below. First, the waste plastics are introduced into the dechlorination furnace 1 via the inlet valve 3 by means of the hopper 2. When the waste plastics are introduced, the exhaust valve 8 is closed. Immediately after the waste plastics are introduced, the inlet valve 3 arranged below the hopper 2 is closed. The waste plastics introduced into the dechlorination furnace 1 are heated and melted in the dechlorination furnace 1, so that the vinyl chlorides contained in the waste plastics are thermally decomposed to produce gases, such as hydrogen chloride and benzene. Simultaneously, plasticizer contained in the plastics is thermally decomposed to produce gases, which mainly include phthalic anhydride and 2-ethyl-1-hexanol. The residual waste plastics are hardly decomposed at 350° C. so that the residual waste plastics remain as molten matter in the dechlorination furnace 1. In addition, about 40% of the vinyl chlorides remain as molten matters in the dechlorination furnace 1 after being decomposed.

On the other hand, the shaft 4c of the rotating cutter 4 provided in the dechlorination furnace 1 is rotated by means of a motor 5, so that the waste plastics are cut up finely by means of the blades 4a, 4b. The vinyl chlorides are viscous at a temperature of 300° C. to 370° C. the temperature at which the dechlorination reaction occurs, so it is difficult to deform the vinyl chlorides just by stirring. Therefore, the block-shaped vinyl chlorides, which are particularly difficult to deform, are cut with the rotating cutter 4 so as to transfer heat to the interior thereof, thereby discharging hydrochloric acid stored within the block-shaped vinyl chlorides to the outside surface. Hydrochloric acid produced by the thermal-decomposition of the vinyl chlorides can be easily gasified from the new surfaces of vinyl chlorides cut with the rotating cutter 4. Moreover, the blades 4a, 4b of the rotating cutter 4 serve as stirring blades to always form new surfaces on the molten plastics. Traces of hydrochloric acid remaining in the molten plastics can be also gasified by the new surfaces of the molten plastics.

As described above, the base portions of the blades 4a, 4b of the rotating cutter 4 are mounted on the shaft 4c at an angle. In the embodiment shown in FIGS. 2a and 2b, the two outer blades 4a, 4b are mounted so as to face flanges 35, 35 on both sides of the dechlorination furnace 1 rake the waste plastics in the dechlorination furnace 1, and the two central inner blades 4a, 4b extrude the plastics outwards, so that the plastics are stirred in the dechlorination furnace 1. The gas produced in the dechlorination furnace 1 is extracted by the exhaust pump 12 via the exhaust pipe 7 to be fed to an exhaust gas treatment system.

During this time, the screws 23a, 23b and the spacers 19, 20, which are provided on the shaft 4c of the rotating cutter 4 shown in FIGS. 2a and 2b, are designed to prevent the molten plastics from leaking through the gaps between the shaft 4c of the rotating cutter 4 and the dechlorination furnace 1.

The solenoid valve 11 is actuated by a control unit 51 according to a signal outputted from the pressure gauge 9 so as to maintain the pressure in the dechlorination furnace 1 at 10 kPa to 60 kPa, preferably at 20 kPa to 40 kPa. When the solenoid valve 11 is not provided, the pressure of the pressure gauge 9 is regulated by adjusting the revolving speed of the exhaust pump 12. When the gas flow rate of the flow meter 10 is sufficiently small, the operation of the motor 5 is stopped, and the discharge valve 14 is opened to discharge the molten plastics in the dechlorination furnace 1 through the discharge pipe 13 to the discharge tank 15. To achieve this, the dechlorination furnace 1 is inclined so that the molten plastics flow with gravity, while the discharge tank 15 is maintained in a vacuum state by means of the vacuum pump 16. Accordingly, this makes possible the easy discharge of the molten plastics from the dechlorination furnace 1 into the discharge tank 15 when discharge valve 14 is opened.

Waste plastics have various shapes, such as bottle shapes and block shapes. According to the present invention, since the dechlorination furnace 1 has the rotating cutter 4, it is sufficient to roughly shred the waste plastics before putting them into the dechlorination furnace 1, thereby saving the trouble of having to finely shred the waste plastics. In addition, according to the present invention, when in a semi-molten state, it is possible to finely cut large lumps of waste plastics by the rotating cutter 4 even if the waste plastics were originally shredded roughly. When this happens, since the waste plastics have new surfaces, heat can be quickly transferred into the inside. In addition, the cracked gases of vinyl chlorides can be easily extracted due to the increase of new surfaces. In general, although the vinyl chlorides have a minimum viscosity at about 250° C. they maintain their form when dechlorination begins. The dechlorination reaction occurs actively on the surfaces of vinyl chloride, where the heat transfer is good and the produced hydrochloric acid is easily extracted. In the embodiment of this invention, the rotating cutters 4 cut the molten vinyl chlorides thereby preventing hydrochloric acid from being confined in the vinyl chlorides with a high viscosity, and in turn making it is possible to increase the dechlorination rate.

Figure 3:
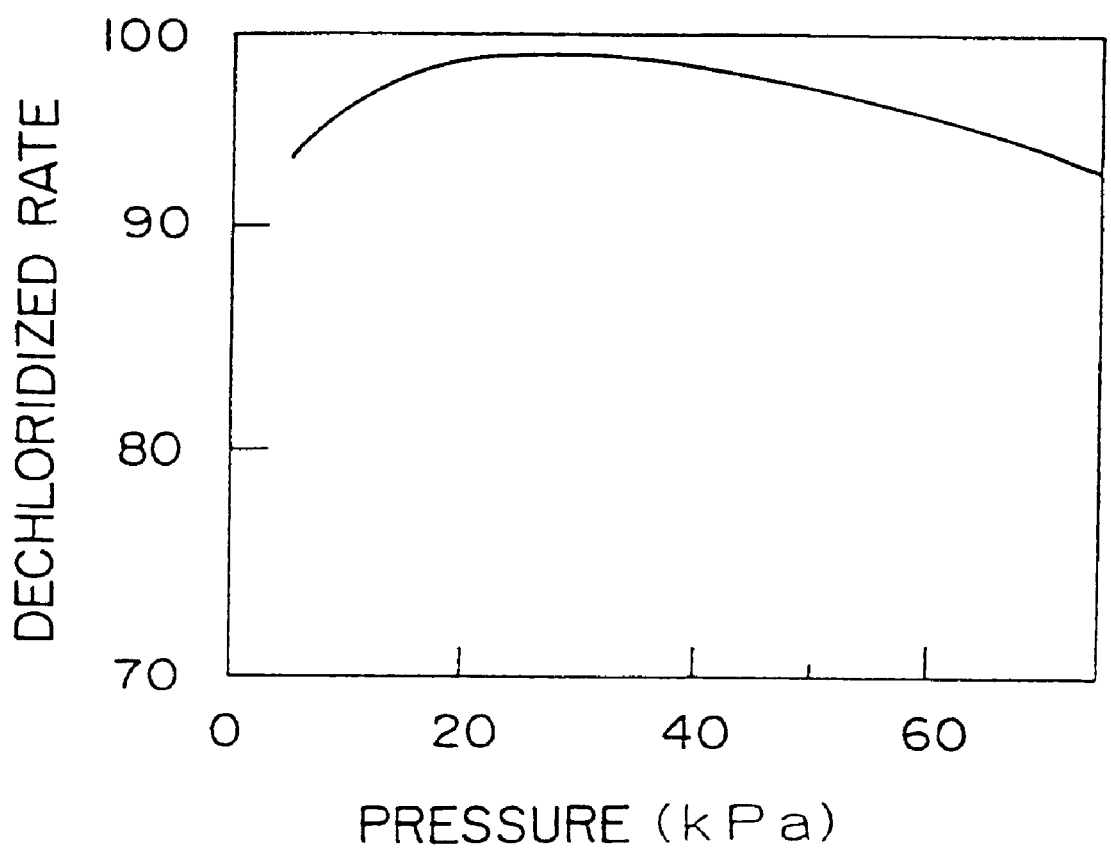
FIG. 3 is a graph showing the relationship between the pressure and the dechlorination rate in a dechlorination furnace.

Moreover, in the present invention, dechlorination is carried out at a pressure of 10 kPa to 60 kPa, which is lower than atmospheric pressure (101.3 kPa). When the dechlorination is carried out at such a low pressure, the cracked gas produced in the waste plastics is easily discharged to the outside of the waste plastics. FIG. 3 shows the results of experiment on the dechlorination rates for a variety of dechlorination pressure in the dechlorination furnace 1. The dechlorination rate peaks at a pressure of 20 kPa to 40 kPa. When the dechlorination pressure is higher or lower than this pressure range, the dechlorination rate decreases. When the pressure is too low, the radical reaction is inhibited by the produced hydrochloric acid. When the pressure is high, the produced hydrochloric acid reacts again with the organic matters and additives contained in the waste plastics, so that the dechlorination rate decreases. Thus, when the dechlorination reaction in the dechlorination furnace 1 is conducted under a pressure of 20 kPa to 40 kPa, high quality fuel from waste plastics can be obtained.

Figure 7:
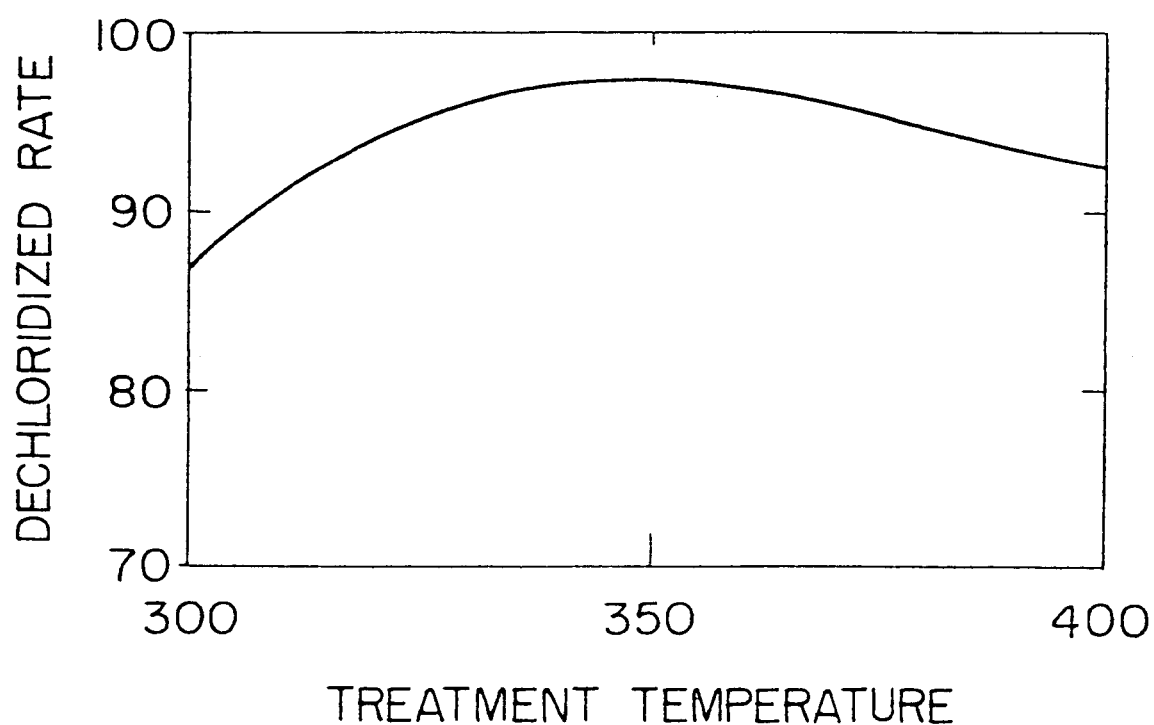
FIG. 7 is a graph showing the relationship between the treatment temperature and the dechlorination rate.

Although the treatment temperature in the dechlorination furnace 1 is maintained at about 350° C. it is possible to obtain a certain dechlorination rate if the treatment temperature is in the range of 300° C. to 400° C. as shown in FIG. 7. If the treatment temperature is in the range from 330° C. to 360° C. it is possible to obtain a better dechlorination rate.

In addition, since the finish of hydrochloric acid production in the dechlorination furnace 1 is indicated by the flow meter 10, treatment can be always carried out at a high dechlorination rate. The indicated flow rate of the flow meter 10 is a high value when the dechlorination reaction occurs. The indicated flow rate is zero when the dechlorination reaction is completed. Thus, the end of the dechlorination reaction can be detected. If the optimum temperature and pressure conditions for dechlorination are maintained through the dechlorination treatment, a higher dechlorination rate can be achieved. On the other hand, in conventional systems, the dechlorination reaction changes in accordance with the adjustment of valves, the quantity of input plastics, and the percentage content of PVC, so that it is not always possible to obtain the same dechlorination rate.

Furthermore, when the pressure in the dechlorination furnace 1 is controlled as described above, the revolving speed of the exhaust pump 12 may be changed so that the pressure measured by the pressure gauge 9 is in the above described pressure range. In such a case, if the revolving speed of the exhaust pump 12 is monitored, the revolving speed will be high when a large quantity of hydrochloric is produced, and the revolving speed will be low (or the exhaust pump is stopped) when the production of hydrochloric acid is completed. Thus the revolving speed of the pump may be referred to as an indication of flow value. The value of the torque meter 6 or the driving power for the motor 5 may be also referred to as an indication of the dechlorination progress of flow meter 10.

Figure 4:
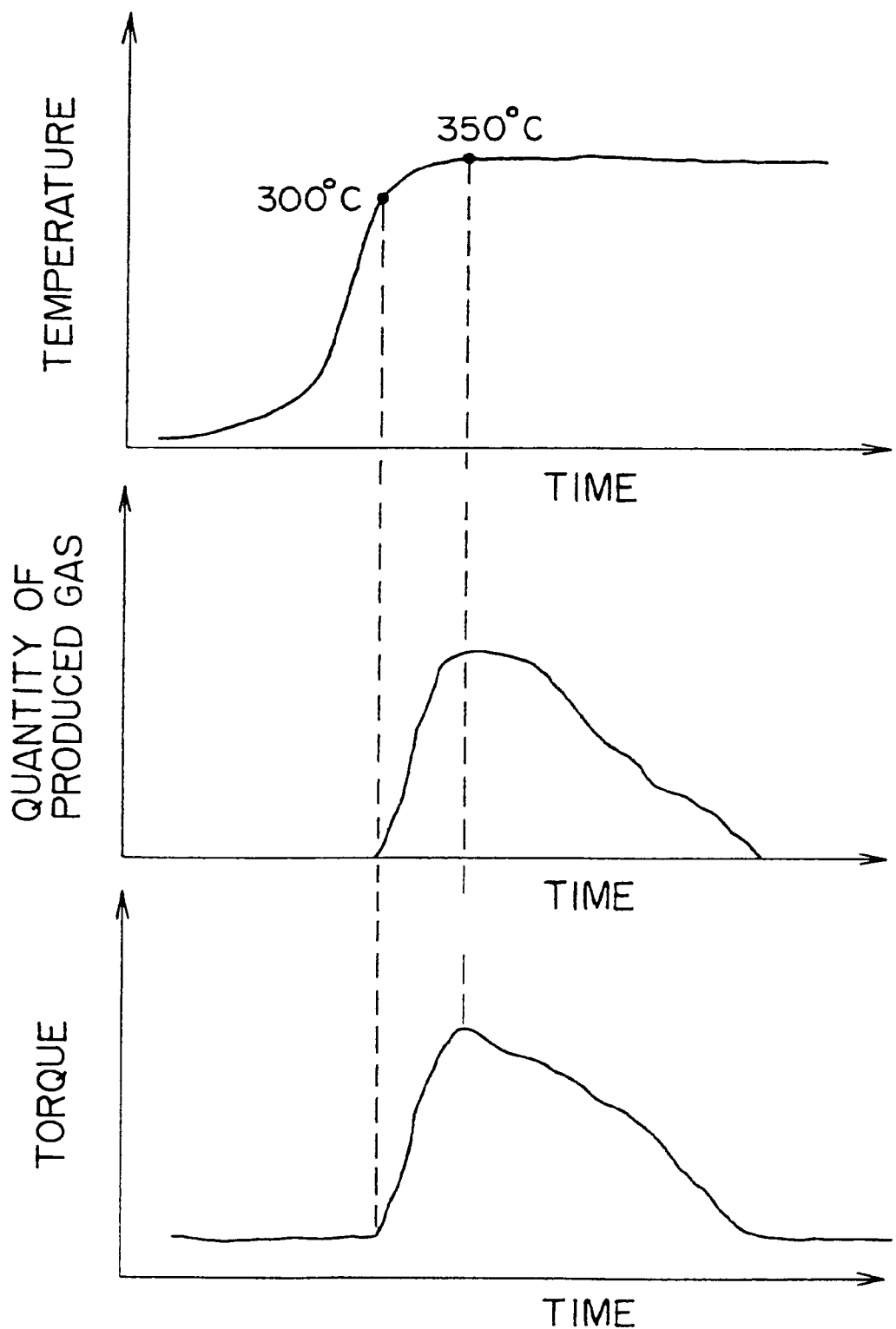
FIG. 4 is a graph showing the relationships between the wall surface temperature of the dechlorination furnace, the amount of hydrochloric acid produced and the driving torque of a rotating cutter over time.

FIG. 4 shows the changes of the wall surface temperature of the dechlorination furnace 1, the amount of hydrochloric acid production and the driving torque of the rotating cutter 4. As shown in FIG. 4, when the wall surface temperature exceeds 300° C. the production of hydrochloric acid begins, and simultaneously, the driving torque of the rotating cutter 4 also increases. When the wall surface temperature reaches 350° C., the production of gas, and the torque reach maximum value. Thereafter, the torque decreases as the dechlorination proceeds. When the production of hydrochloric acid gas is completed, the torque nearly returns to the original value. Since the change of hydrochloric acid production has a close correlation with the torque change, it is. possible to know the amount of hydrochloric acid production by the driving torque change or the driving power of the rotating cutter 4.

It was found that on average about 98% of chlorine contained in waste plastics was removed by the dechlorination treatment according to the present invention (see FIG. 7). At the same time, the natural combustion energy of the waste plastics does not decrease. However, about 2% of chlorine remains. In addition, the waste plastics contain metals, such as lead, for coloring or stabilizing the plastics. For this reason, it is considered that even if the dechlorination treatment has been carried out, the combustion of such plastics may have a bad influence on environment. Therefore, waste plastics treated by the system of the present invention should preferably be burned in equipment having a system for changing the combustion gas harmless. One of most promising combustion facilities would be a coal fired power plant having such equipment. Waste plastics leave a smaller amount of ash and have a higher combustion heat than coal. Therefore, by burning such waste plastics with coal, in coal power generation stations, the quantity of coal and ash can be reduced.

Second Preferred Embodiment

Figure 5:
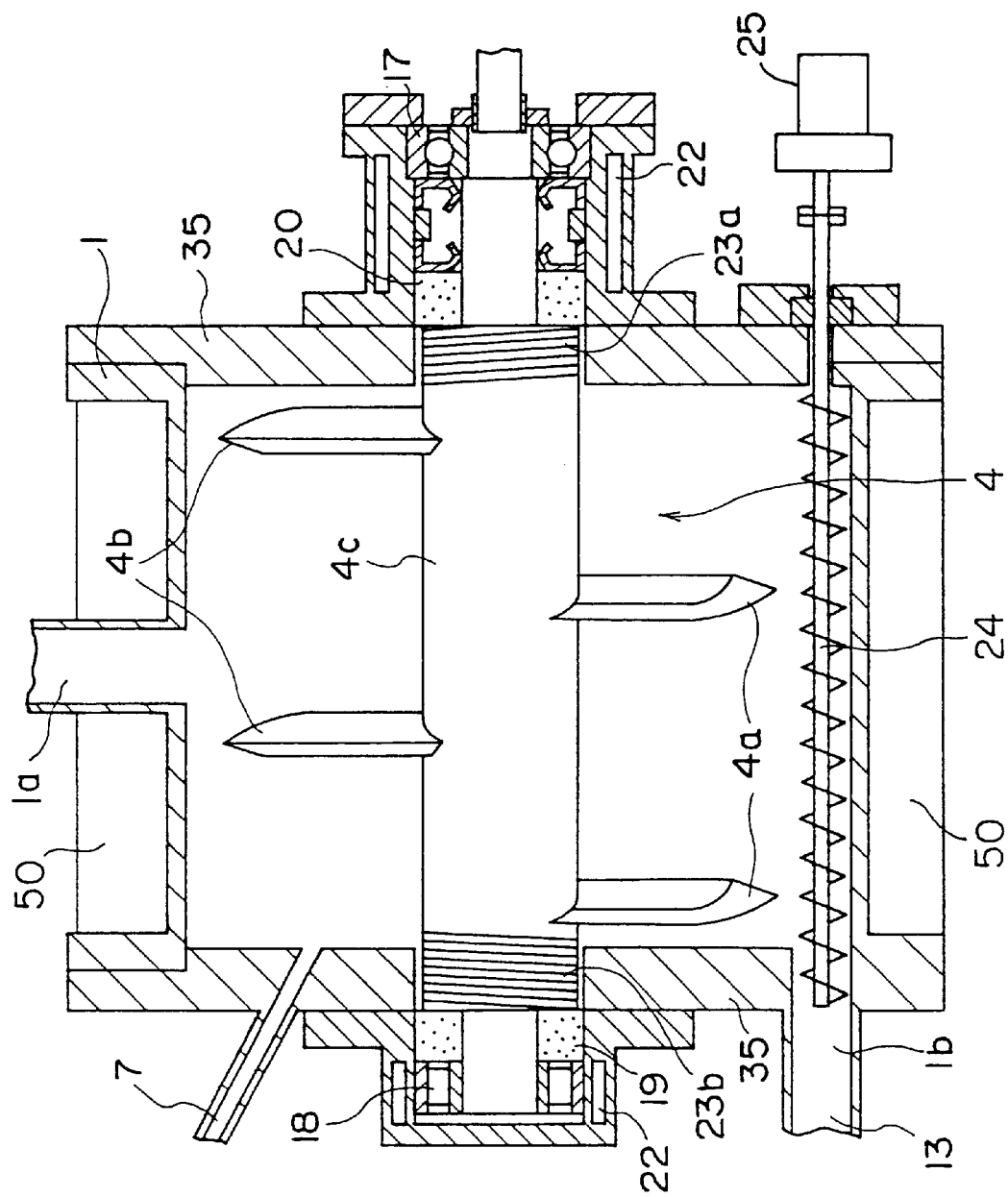
FIG. 5 is a schematic view of the second preferred embodiment of a waste plastic dechlorination system according to the present invention.

Referring to FIG. 5, the second preferred embodiment of a waste plastic dechlorination system according to the present invention will be described below.

In the second preferred embodiment shown in FIG. 5, a screw conveyor 24 is provided in a dechlorination furnace 1, and a drive unit 25 is connected to the screw conveyor 24, one side is inserted in the tube of an outlet 1b. In FIG. 5, the same reference numbers are used for the common parts appearing in FIGS. 1 through 4 for the first preferred embodiment and the detailed descriptions thereof are omitted.

After the dechlorination treatment, vinyl chlorides are viscous and have a bad liquidity. The dechlorination furnace 1 shown in FIG. 1 is tilted to discharge the molten plastics containing vinyl chlorides after the dechlorination treatment. However, when the percentage of vinyl chlorides contained in the plastics is higher, the discharge takes a lot of time. In the case of FIG. 5, the treated waste plastics in the dechlorination furnace 1 can be efficiently discharged through the outlet 1b by the forward movement of the screw conveyor 24. In addition, the waste plastics in the dechlorination furnace 1 can be circulated by the reverse movement of the screw conveyer 24 during the dechlorination treatment, so that the dechlorination rate can be more uniformly maintained. As shown in FIG. 5, untreated waste plastics do not enter a discharge pipe 13, so they are not discharged without being dechlorinated. In addition, if the screw conveyor 24 is provided, it is not required to tilt the whole dechlorination furnace 1 in order to discharge, thereby allowing large-scale systems to be easily formed.

Third Preferred Embodiment

Figure 6:
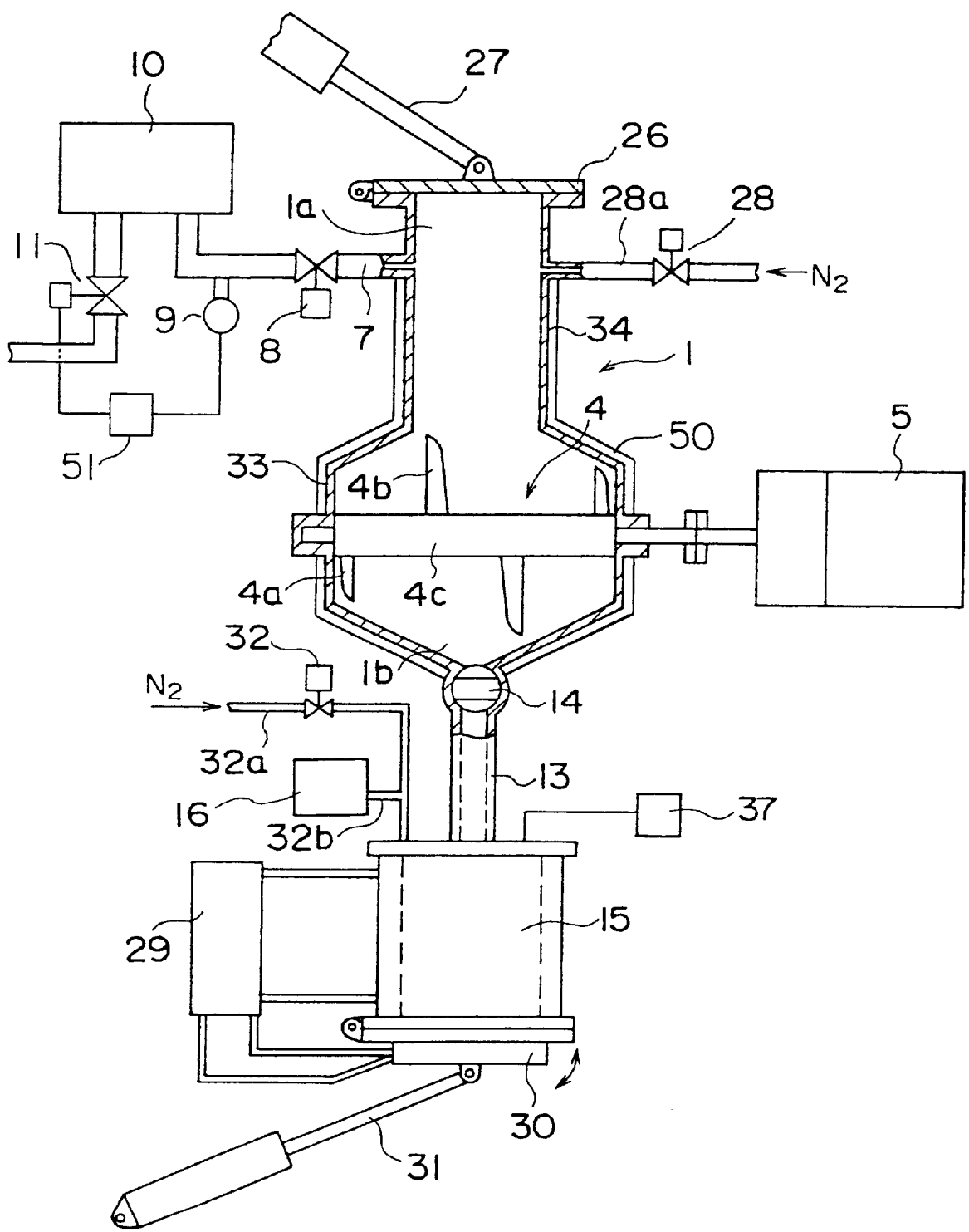
FIG. 6 is a schematic view of the third preferred embodiment of a waste plastic dechlorination system according to the present invention.

Referring to FIG. 6, the third preferred embodiment of a waste plastic dechlorination system according to the present invention will be described below.

As shown in FIG. 6, the waste plastic dechlorination system comprises a dechlorination furnace 1 having a heating temperature control unit 50, and a rotating cutter 4 provided in the dechlorination furnace 1. The dechlorination furnace 1 comprises: a cylindrical furnace body 33, surrounding the rotating cutter 4 and which has a large diameter central portion that is tapered towards the left and right ends; and a vertical pipe 34 connected to the upper portion of the furnace body 33.

On the upper portion (inlet portion) 1a of the vertical pipe 34, an inlet lid 26 driven by a hydraulically operated rod 27 is mounted. An exhaust pipe 7 having an exhaust valve 8 is connected to the upper portion 1a of the vertical pipe 34. A pressure gauge 9, a flow meter 10, a solenoid valve 11 and an exhaust pump 12 are sequentially connected to the exhaust pipe 7 (see FIG. 1).

Also as shown in FIG. 6, a pressurizing pipe 28a having a valve 28 is connected to the upper portion 1a of the vertical pipe 34 for supplying $N_2$ gas into the dechlorination furnace 1 to pressurize the interior of the dechlorination furnace 1.

The rotating cutter 4 comprises a shaft 4c, and blades 4a, 4b fixed thereto. The shaft 4c is connected to a motor 5. To the lower end (outlet portion) of the central portion of the furnace body 33, a discharge tank 15 is connected via a discharge pipe 13 having a discharge valve 14.

To the discharge tank, 15, a pressurizing pipe 32a having a valve 32 for supplying $N_2$ gas into the discharge tank 15 is connected. The downstream end of the pressurizing pipe 32a branches to form a branch pipe 32b, to which a vacuum pump 16 is connected.

On the lower end portion of the discharge tank 15, a discharge lid 30 driven by a hydraulically operated rod 31 is equipped.

Furthermore, in the case where the maximum diameter of the furnace body 33 is located at the right or left end, the discharge pipe 13 is preferably provided at the place having the maximum diameter (e.g., the left end).

With this construction, the operation of this preferred embodiment is described below.

First, the input lid 26 is opened, and waste plastics are inputted into the dechlorination furnace 1 via the input lid 26. When the waste plastics are bulky, the waste plastics reach the upper portion of the vertical pipe 34.

In the case of a large system, when the introduced quantity of the waste plastics is great, a hopper (not shown) is provided on the outside of the system, and the waste plastics to be treated are inputted all at once. Immediately after the input is completed, the input lid 26 is closed, and the operation of the rotating cutter 4 is started. Simultaneously, the exhaust valve 8 is open, and the pressure in the dechlorination furnace 1 is reduced to a treatment pressure ranging from 10 kPa to 60 kPa by the exhaust pump 12. The furnace body 33 and the vertical pipe 34 are preheated to a predetermined treatment temperature. As described above, the treatment efficiency is best, when the treatment temperature is set to around 350° C. The waste plastics are melted in the dechlorination furnace 1, and vinyl chlorides in the waste plastics are dechloridized. When the quantity of gas flowing through the flow meter 10 is sufficiently small, the operation of the rotating cutter 4 is stopped and the exhaust valve 8 is closed. Then, $N_2$ gas is supplied from the pressurizing pipe 28a to the dechlorination furnace 1 to increase the internal pressure in the dechlorination furnace 1 to atmospheric pressure. During the above operation, the molten plastics are collected in the lower portion of the dechlorination furnace 1. The air in the discharge tank 15 is pumped out by the vacuum pump 16 beforehand, and the discharge valve 14 is open. At this time, the pressure difference between the dechlorination furnace 1 and the discharge tank 15 is 1 atm, so that the molten plastics in the dechlorination furnace 1 are sucked into the discharge tank 15. When the pressure indicated by a pressure gauge 37 mounted on the discharge tank 15 raises approximately to atmospheric pressure, the discharge valve 14 is closed. During this time, the discharge tank 15 is cooled by cooling water supplied from a cooler 29. Then, the treated molten plastics are solidified in the water-cooled discharge tank 15 and are molded to the shape of the tank. The shape of the discharge tank 15 is preferably a shape allowing for the easy loading and storing of the solidified plastics, such as a cube. When the plastics are solidified, the volume thereof is decreased by cooling. Therefore, when the discharge lid 30 of the discharge tank 15 is opened, the plastic lump falls out by its own weight. In the case where corrosion may occur due to high humidity when air is sucked out, $N_2$ gas is supplied from the pressurizing pipe 32a to the discharge tank 15.

In FIG. 6, the portion of the dechlorination furnace 1 connected to the discharge pipe 13 is lowest and thickest, so the dechlorination furnace 1 does not need to be inclined. In a large system, the rotating cutter 4 would be also heavy. If such a heavy load was inclined, a large thrust force would be applied in an axial direction of a bearings which would decrease the life of the bearing. According to this preferred embodiment, since the dechlorination furnace 1 is not inclined, it is possible to increase the life of the bearing and it is possible to easily carry out maintenance.

In this preferred embodiment, when the treated molten plastics are discharged, the molten plastics are pressurized and pushed out with $N_2$ gas supplied from the pressurizing pipe 28a into the dechlorination furnace 1, so that the molten plastics can be discharged quickly. Although the molten plastics are sucked into the discharge tank 15 by the pressure difference between the dechlorination furnace 1, to which nitrogen gas is supplied, and the evacuated discharge tank 15, nitrogen gas is not introduced into the discharge tank 15 until most of the molten plastics have been sucked out. Moreover, since the discharge valve 14 is mounted directly on the dechlorination furnace 1, the upper portion of the discharge valve 14 is not plugged clogged with untreated plastics, enabling all the input plastics can be dechloridized.

The treated plastics are cooled in the water-cooled discharge tank 15 and are thus solidified in a predetermined shape. The treated plastics are solidified when being cooled to about 150° C. The treated plastics can be solidified into a cube shape, allowing for compact storage and easy transportation. In addition, the shape plastics can also be formed into a cylindrical shape, allowing for easy carriage.

Fourth Preferred Embodiment

Figure 8:
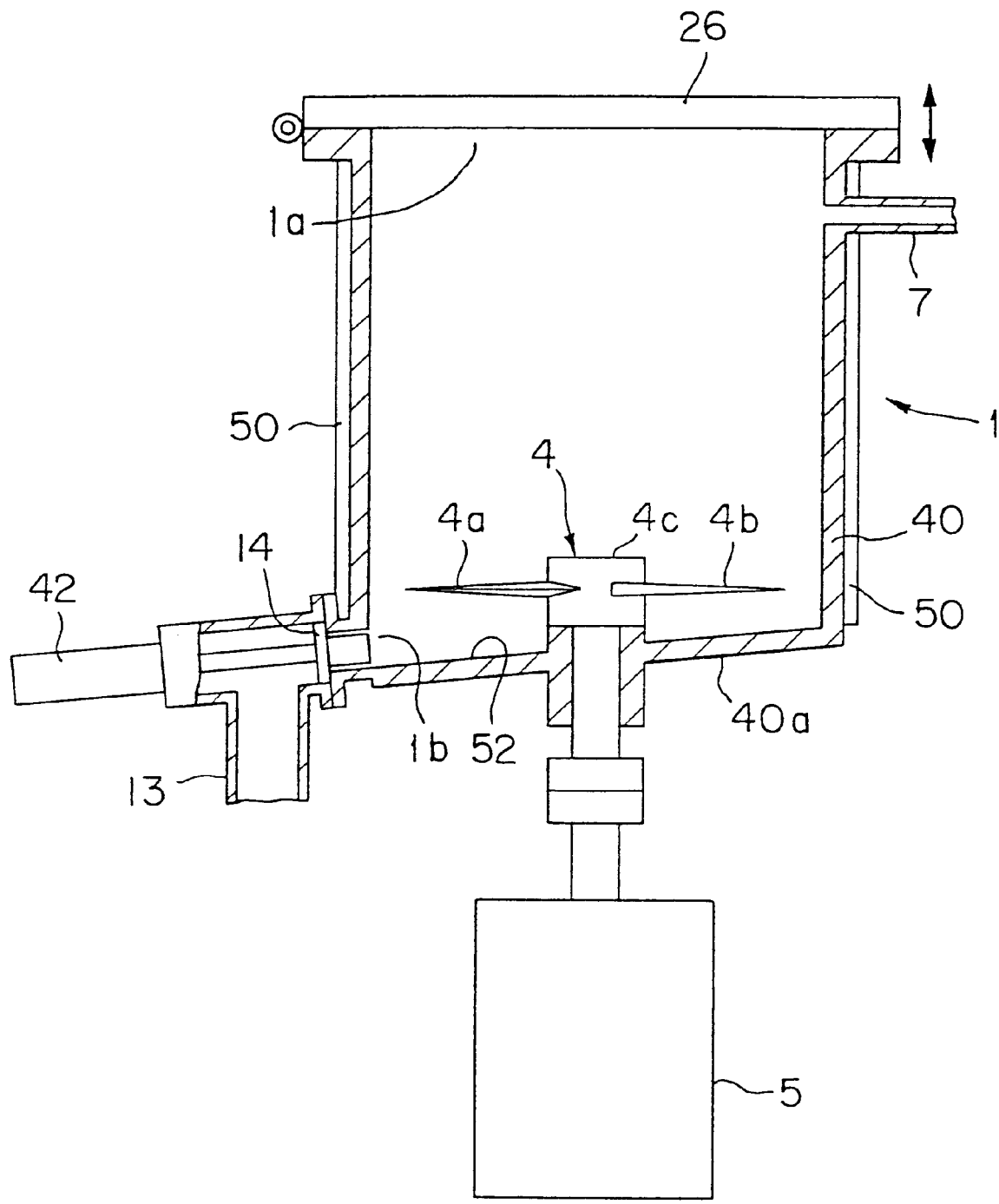
FIG. 8 is a schematic view of the fourth preferred embodiment of a waste plastic dechlorination system according to the present invention.

Referring to FIG. 8, the fourth preferred embodiment of a waste plastic dechlorination system according to the present invention is described below.

As shown in FIG. 8, the waste plastic dechlorination system comprises a dechlorination furnace 1 having a heating/temperature control unit 50, and a rotating cutter 4 provided in the dechlorination furnace 4. The dechlorination furnace 1 comprises a cylindrical furnace body 40 having an inclined bottom 40a. The rotating cutter 4 is provided in the dechlorination furnace 1 so that the cutter shaft passes through the bottom 40a. The rotating cutter 4 comprises a shaft 4c arranged so as to be coaxial with the furnace body 40, and blades 4a, 4b fixed to the shaft 4c. The shaft 4c is connected to a motor 5.

On the upper portion (inlet portion) 1a of the furnace body 40, an input lid 26 is mounted. To the left-side lower end (outlet portion) 1b of the bottom 40a of the furnace body 40, a discharge pipe 13 having a discharge valve 14 is connected. This discharge valve 14 is actuated by a piston drive unit 42.

According to this preferred embodiment, since the shaft 4c of the rotating cutter 4 is arranged so as to be coaxial with the furnace body 40, the waste plastics entering from the input lid 26 can be efficiently broken up and stirred by the blades 4a, 4b perpendicular to the flow direction of the inputted plastics.

As described above, according to the present invention, heat treatment is carried out while cutting the waste plastics containing vinyl chlorides are cut up in the dechlorination furnace, and the produced gas is removed by the exhaust extractor, thereby allowing the effective removal of chlorine from the waste plastics containing vinyl chlorides.

What is claimed is:

1. A waste plastic dechlorination system comprising:
   a dechlorination furnace having an inlet and an outlet, for thermally decomposing waste plastics containing vinyl chloride in order to dechlorinate the waste plastic;
   a rotating cutter provided in the dechlorination furnace and including a plurality of blades inclined relative to an axial direction of the rotating cutter to shred and move waste plastics in opposing directions, thereby increasing a dechlorination rate of the waste plastic;
   a pressure gauge for measuring a pressure in the dechlorination furnace;
   an exhaust apparatus connected to the dechlorination furnace via an exhaust pipe, for extracting a gas produced in the dechlorination furnace; and
   a control unit for controlling the exhaust apparatus in accordance with a signal outputted from a pressure gauge.

2. A waste plastic dechlorination system as set forth in claim 1, wherein the rotating cutter includes a shaft for supporting the plurality of blades and the control unit controls the exhaust apparatus so that the pressure in the dechlorination furnace is maintained at a pressure of 10 kPa to 60 kPa while the plurality of blades of the rotating cutter cuts up the waste plastics so as to transfer heat from the shaft to a first portion of waste plastics located adjacent to the shaft and transfer heat from the plurality of blades to a second portion of waste plastics located adjacent to the plurality of blades and spaced away from the first portion of waste plastics.

3. A waste plastic dechlorination system as set forth in claim 1, wherein the rotating cutter comprises a shaft for supporting the plurality of blades.

4. A waste plastic dechlorination system as set forth in claim 3, wherein the plurality of blades of the rotating cutter comprise a first blade inclined relative to the shaft of the rotating cutter so as to push the waste plastics towards a first direction and cut up the waste plastic, and a second blade inclined relative to the shaft of the rotating cutter so as to push the waste plastics towards a second direction and cut up the waste plastic.

5. A waste plastic dechlorination system as set forth in claim 3, wherein the shaft of the rotating cutter includes a first end supported by a first flange, a second end supported by a second flange, and a central portion separating the first and second ends, a first screw thread adjacent to the first end and inclined toward a first direction, and a second screw thread adjacent to the second end and inclined toward a second direction.

6. A waste plastic dechlorination system as set forth in claim 1, wherein a discharge tank for discharging residual waste plastics is connected to the outlet of the dechlorination furnace.

7. A waste plastic dechlorination system as set forth in claim 6,
   wherein a vacuum pump for evacuating an interior of the discharge tank is connected to the discharge tank.

8. A waste plastic dechlorination system as set forth in claim 6,
   wherein a cooling apparatus for cooling an interior of the discharge tank is connected to the discharge tank.

9. A waste plastic dechlorination system as set forth in claim 1,
   further comprising a screw conveyor provided in the dechlorination furnace and having one end inserted in the outlet.

10. A waste plastic dechlorination system as set forth in claim 1,
    wherein a pressurizing unit is connected to the dechlorination furnace via a pressurizing pipe.

11. A waste plastic dechlorination system as set forth in claim 1,
    wherein a bottom of the dechlorination furnace is inclined, and the outlet is provided at a lower end of the bottom.

12. A waste plastic dechlorination system as set forth in claim 1,
    wherein the dechlorination furnace comprises: a cylindrical furnace body which is coaxial to the rotating cutter and has a large diameter central portion that is tapered towards the left and right ends; and a vertical pipe connected to the upper portion of the furnace body, the outlet being provided at the lower end of a central portion of the furnace body.

13. A waste plastic dechlorination system as set forth in claim 1,
    wherein the rotating cutter is arranged horizontally in the dechlorination furnace.

14. A waste plastic dechlorination system as set forth in claim 1,
    wherein the rotating cutter is arranged vertically in the dechlorination furnace.

15. A waste plastic dechlorination system as set forth in claim 3, wherein each of the plurality of blades of the rotating cutter comprise a blade segment extending around a section of the circumference of the shaft.

16. A waste plastic dechlorination system as set forth in claim 3, wherein the rotating cutter comprises a screw thread provided on the shaft of the rotating cutter.

17. A waste plastic dechlorination system as set forth in claim 16, wherein the plurality of blades are spaced away from each other by a first distance greater than a second distance between ridges of the screw thread.

18. A waste plastic dechlorination system as set forth in claim 16, wherein the plurality of blades each extend away from the shaft by a first height and the screw thread extends away from the shaft by a second height that is less than the first height.

19. A waste plastic dechlorination system as set forth in claim 3, wherein each of the plurality of blades includes a base portion defining an angle relative to an axial direction of the shaft for pushing the waste plastics along a direction parallel to the axial direction of the shaft.

20. A waste plastic dechlorination system as set forth in claim 3, wherein the plurality of blades comprise first and second blades separated by a third blade, the first and second blades being inclined relative to the shaft for propelling the waste plastics toward an inward direction, and the third blade being inclined relative to the shaft for propelling the waste plastics toward an outward direction.

21. A waste plastic dechlorination system as set forth in claim 1, wherein the rotating cutter includes a shaft for supporting the plurality of blades, and each of the plurality of blades includes a cutting surface extending along a radial direction.

22. A waste plastic dechlorination system as set forth in claim 1, wherein the rotating cutter includes a shaft for supporting the plurality of blades and is configured for transferring heat from the shaft to a first portion of the waste plastics located adjacent to the shaft and transfer heat from the plurality of blades to a second portion of the waste plastics located adjacent to the plurality of blades and spaced away from the first portion of the waste plastics.

23. A waste dechlorination system for thermally decomposing waste plastics containing vinyl chloride so as to dechlorinate the waste plastic comprising:
  a dechlorination furnace having an inlet opening for receiving a plurality of substantially block-shaped vinyl chloride plastics material and an outlet opening for discharging a shredded and thermally decomposed waste plastics material;
  a heating temperature control unit for supplying heat to the plastics material in the dechlorination furnace so as to create dechlorination reactions with surfaces of the plastics material and produce exhaust gases;
  a rotating shaft extending inside the dechlorination furnace and having first and second ends separated by a plurality of segmented cutting blades extending away from the shaft along a direction perpendicular to an axial direction of the shaft so as to shred the substantially block-shaped plastics material, form a plurality of shredded plastic material having new surfaces, and allow heat to be transferred to the new surfaces of the shredded waste plastics so as to create additional dechlorination reactions and produce an increased amount of exhaust gases, the shaft including at least one helical thread adjacent to one of the first and second ends;
  a pressure sensor for sensing a pressure in the dechlorination furnace; and
  an exhaust control device including an exhaust pipe connected to the dechlorination furnace, an exhaust release valve, a flow meter, a pump, and a control unit in communication with the pressure sensor, the exhaust release valve, flow meter, and pump so as to control a dechlorination rate of the dechlorination furnace by regulating the pressure in the dechlorination furnace and regulating a discharge flow rate of the produced exhaust gases.

24. The waste dechlorination system of claim 23, wherein the shaft includes a central portion between the first and second ends of the shaft, and the plurality of segmented cutting blades includes a first blade adjacent to the first end of the shaft and inclined relative to the axial direction of the shaft so as to push plastics material toward the central portion, a second blade adjacent to the second end of the shaft and inclined relative to the axial direction of the shaft so as to push plastics material toward the central portion, and a third blade extending from the central portion of the shaft and inclined relative to the axial direction of the shaft so as to push plastics material toward the second blade.

25. The waste dechlorination system of claim 24, wherein the plurality of segmented cutting blades include a fourth blade extending from the central portion and inclined relative to the axial direction of the shaft so as to push plastics material toward the first blade.

26. The waste dechlorination system of claim 24, wherein the control unit of the exhaust control device is configured to control the dechlorination rate of the dechlorination furnace by maintaining the pressure in the dechlorination furnace under 60 kPa.

27. The waste dechlorination system of claim 23, wherein the control unit of the exhaust control device is configured to control the dechlorination rate of the dechlorination furnace by maintaining the pressure in the dechlorination furnace above 10 kPa.

28. The waste dechlorination system of claim 23, wherein the shaft includes a central portion between the first and second ends of the shaft, and the at least one helical thread includes a first helical thread located adjacent to the first end of the shaft and a second helical thread located adjacent to the second end of the shaft, the first and second helical threads each being inclined toward a central portion of the shaft.

29. A method for thermally decomposing waste plastics containing vinyl chloride so as to dechlorinate the waste plastic comprising:
  providing a dechlorination furnace having an inlet opening for receiving a plurality of substantially block-shaped vinyl chloride plastics material and an outlet opening for discharging a shredded and thermally decomposed waste plastics material;
  providing a heating temperature control unit for supplying heat to the plastics material in the dechlorination furnace so as to create dechlorination reactions with surfaces of the plastics material and produce exhaust gases;
  providing a rotating shaft extending inside the dechlorination furnace and having first and second ends separated by a plurality of segmented cutting blades extending away from the shaft along a direction perpendicular to an axial direction of the shaft so as to shred the substantially block-shaped plastics material, form a plurality of shredded plastic material having new surfaces, and allow heat to be transferred to the new surfaces of the shredded waste plastics so as to create additional dechlorination reactions and produce an increased amount of exhaust gases, the shaft including at least one helical thread adjacent to one of the first and second ends;
  providing a pressure sensor for sensing a pressure in the dechlorination furnace; and
  providing an exhaust control device including an exhaust pipe connected to the dechlorination furnace, and a control unit in communication with the pressure sensor so as to control a dechlorination rate of the dechlorination furnace by regulating the pressure in the dechlorination furnace and regulating a discharge flow rate of the produced exhaust gases.

30. The method of claim 29, wherein the shaft includes a central portion between the first and second ends of the shaft and the plurality of segmented cutting blades includes a first blade adjacent to the first end of the shaft and inclined relative to the axial direction of the shaft so as to push plastics material toward the central portion, a second blade adjacent to the second end of the shaft and inclined relative to the axial direction of the shaft so as to push plastics material toward the central portion, and a third blade extending from the central portion of the shaft and inclined relative to the axial direction of the shaft so as to push plastics material toward the second blade.

31. The method of claim 29, wherein the plurality of segmented cutting blades include a fourth blade extending from the central portion and inclined relative to the axial direction of the shaft so as to push plastics material toward the first blade.

32. The method of claim 29, wherein the control unit of the exhaust control device controls the dechlorination rate of the waste plastics in the dechlorination furnace by maintaining the pressure in the dechlorination furnace under 60 kPa.

33. The method of claim 29, wherein the control unit of the exhaust control device controls the dechlorination rate of the waste plastics in the dechlorination furnace by maintaining the pressure in the dechlorination furnace above 10 kPa.

* * * * *